(12) United States Patent
Lu et al.

(10) Patent No.: US 7,918,791 B2
(45) Date of Patent: Apr. 5, 2011

(54) OPTICAL SCANNING PROBE

(75) Inventors: Chih-Wei Lu, Taipei County (TW); Chia-Wei Sun, Taipei (TW); Gwo-Bin Lee, Tainan (TW); Te-Yang Shen, Taoyuan Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/410,368

(22) Filed: Mar. 24, 2009

(65) Prior Publication Data
US 2010/0123903 A1   May 20, 2010

(30) Foreign Application Priority Data
Nov. 19, 2008   (TW) ................. 97144653 A

(51) Int. Cl.
*A61B 1/06* (2006.01)
*A61B 8/14* (2006.01)
*A61B 6/00* (2006.01)

(52) U.S. Cl. ......... 600/182; 600/466; 600/473; 600/478
(58) Field of Classification Search ........... 356/601–640
See application file for complete search history.

(56) References Cited

U.S. PATENT DOCUMENTS

| | | | |
|---|---|---|---|
| 3,773,039 A * | 11/1973 | Mori et al. | 600/173 |
| 4,732,156 A * | 3/1988 | Nakamura | 600/445 |
| 4,958,932 A * | 9/1990 | Kegelman et al. | 356/636 |
| 5,122,900 A * | 6/1992 | Tamburrino et al. | 359/367 |
| 5,271,402 A * | 12/1993 | Yeung et al. | 600/437 |
| 5,926,262 A * | 7/1999 | Jung et al. | 356/73 |
| 6,134,003 A | 10/2000 | Tearney et al. | |
| 6,400,980 B1 * | 6/2002 | Lemelson | 600/478 |
| 6,564,087 B1 | 5/2003 | Pitris et al. | |
| 6,797,931 B2 | 9/2004 | Iizuka et al. | |
| 6,888,119 B2 | 5/2005 | Iisuka et al. | |
| 7,180,600 B2 | 2/2007 | Horii et al. | |
| 2006/0241493 A1 * | 10/2006 | Feldman et al. | 600/476 |
| 2007/0161893 A1 * | 7/2007 | Milner et al. | 600/425 |

* cited by examiner

*Primary Examiner* — Gregory J Toatley
*Assistant Examiner* — Jarreas C Underwood

(57) ABSTRACT

An optical scanning probe is provided and includes a housing, a diaphragm disposed in the housing, a rotor, a conduit, an optical fiber module, and a reflector disposed on the rotor, wherein the diaphragm and the housing forms a chamber. The rotor is movably disposed in the chamber and has several fans. The conduit is disposed in the housing to conduct fluid into the chamber, thus impelling the fans and the rotor. The optical fiber module is disposed in the housing and through the diaphragm to transmit a light beam. The reflector rotates with the rotor and reflects the light beam for 360° scanning.

16 Claims, 5 Drawing Sheets

OPTICAL SCANNING PROBE

CROSS REFERENCE TO RELATED APPLICATIONS

This application claims priority of Taiwan Patent Application No. 097144653, filed on Nov. 19, 2008, the entirety of which is incorporated by reference herein.

TECHNICAL FIELD

The invention relates in general to an optical scanning probe and in particular to an optical scanning probe for an endoscope system.

DESCRIPTION OF THE RELATED ART

Conventional scanning probes for optical coherence tomography (OCT) usually comprise an optical fiber module and a reflector to reflect light beams transmitted from the optical fiber module. Some of the scanning probes further comprise driving mechanisms such as micro motors, piezoelectric (PZT) elements, or micro electro-mechanical systems (MEMS) to rotate the reflector for 360° scanning. Since the driving mechanisms are complex and require high driving voltage for scanning, it adversely leads to large dimensions and high cost of the scanning probe.

BRIEF SUMMARY

The present application provides an optical scanning probe including a housing, a diaphragm disposed in the housing, a rotor, a conduit, an optical fiber module, and a reflector disposed on the rotor, wherein the diaphragm and the housing forms a chamber. The rotor is movably disposed in the chamber and has several fans. The conduit is disposed in the housing to conduct fluid into the chamber, thus impelling the fans and the rotor. The optical fiber module is disposed in the housing and through the diaphragm to transmit a light beam. The reflector rotates with the rotor and reflects the light beam for 360° scanning.

BRIEF DESCRIPTION OF DRAWINGS

The application can be more fully understood by reading the subsequent detailed description and examples with references made to the accompanying drawings, wherein.

DETAILED DESCRIPTION

Figure 1:
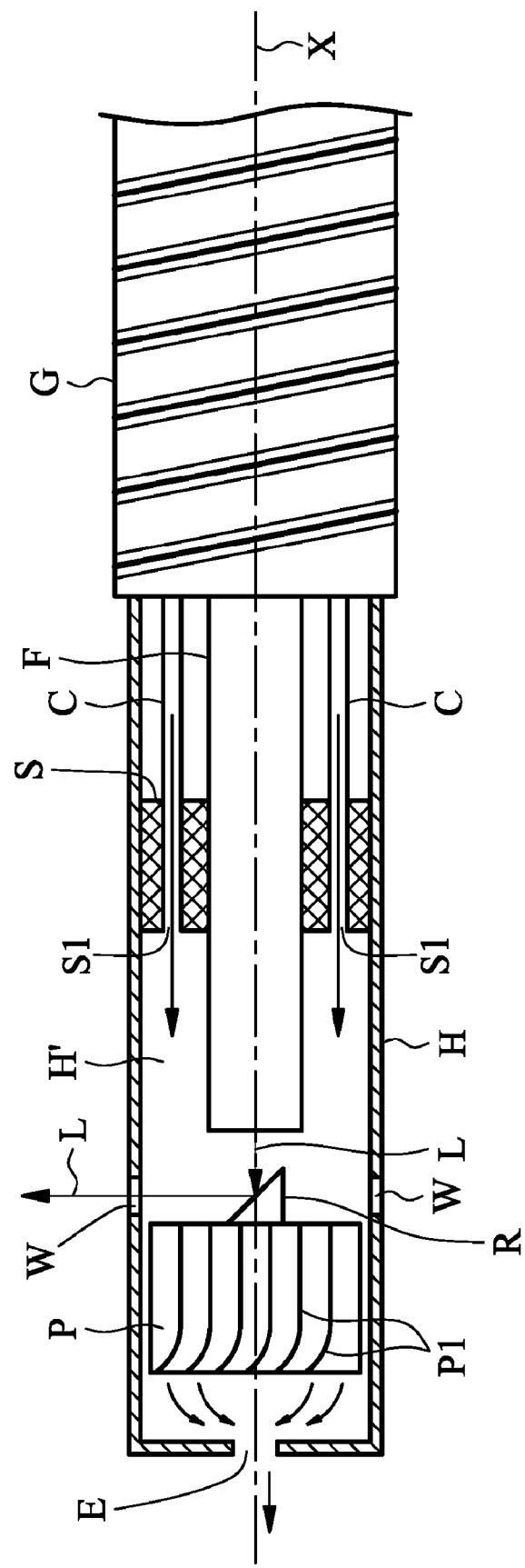
FIG. 1 is a perspective diagram of an optical scanning probe according to an embodiment of the invention.

Referring to FIG. 1, an embodiment of an optical scanning probe for endoscopic optical coherence tomography primarily comprises a housing H, an optical fiber module F, a rotor P, and a reflector R, wherein the housing H may be a plastic member connected with a flexible tube G. As shown in FIG. 1, the optical fiber module F is disposed through a diaphragm S in the housing H and extends along a central axis X. A fluid such as gas, water, glycerol or glucose is pumped through the conduits C beside the optical fiber module F and flows into a chamber H' from the openings S1 of the diaphragm S.

Figure 2:
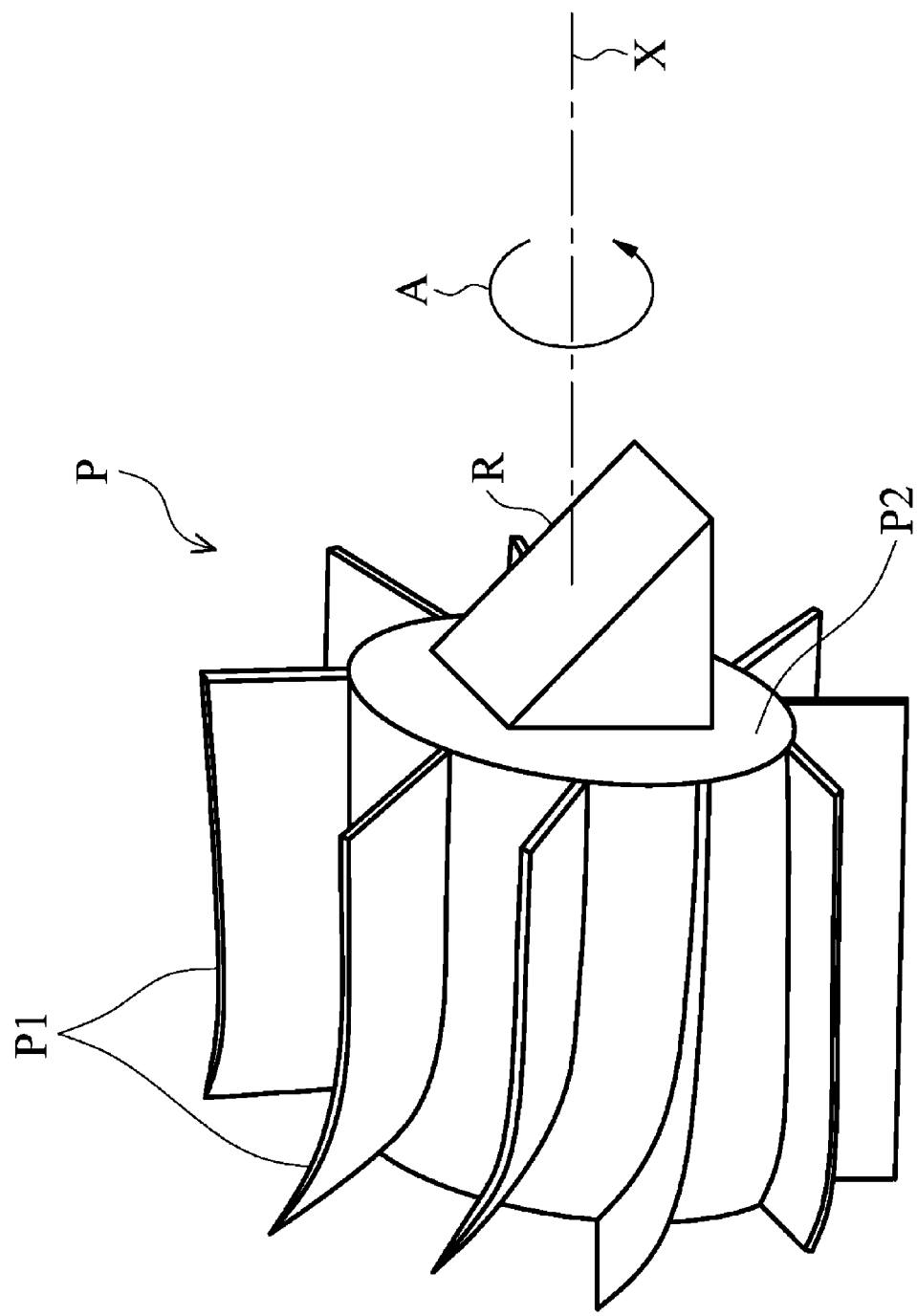
FIG. 2 is perspective diagram of a reflector rotated with a rotor.

Referring to FIGS. 1 and 2, when the fluid is pumped into the chamber H', a plurality of fans P1 of the rotor P are impelled by hydraulic pressure, and the rotor P and the reflector R fixed to an end surface P2 thereof are rotated in a first direction A around the central axis X, as the arrow indicates in FIG. 2. Subsequently, the fluid is discharged from the chamber H' via a hole E formed at a distal of the housing H. Since gas, water, glycerol and glucose are harmless to human bodies, a small amount of the fluid discharged into human bodies is safe and acceptable.

Figure 3:
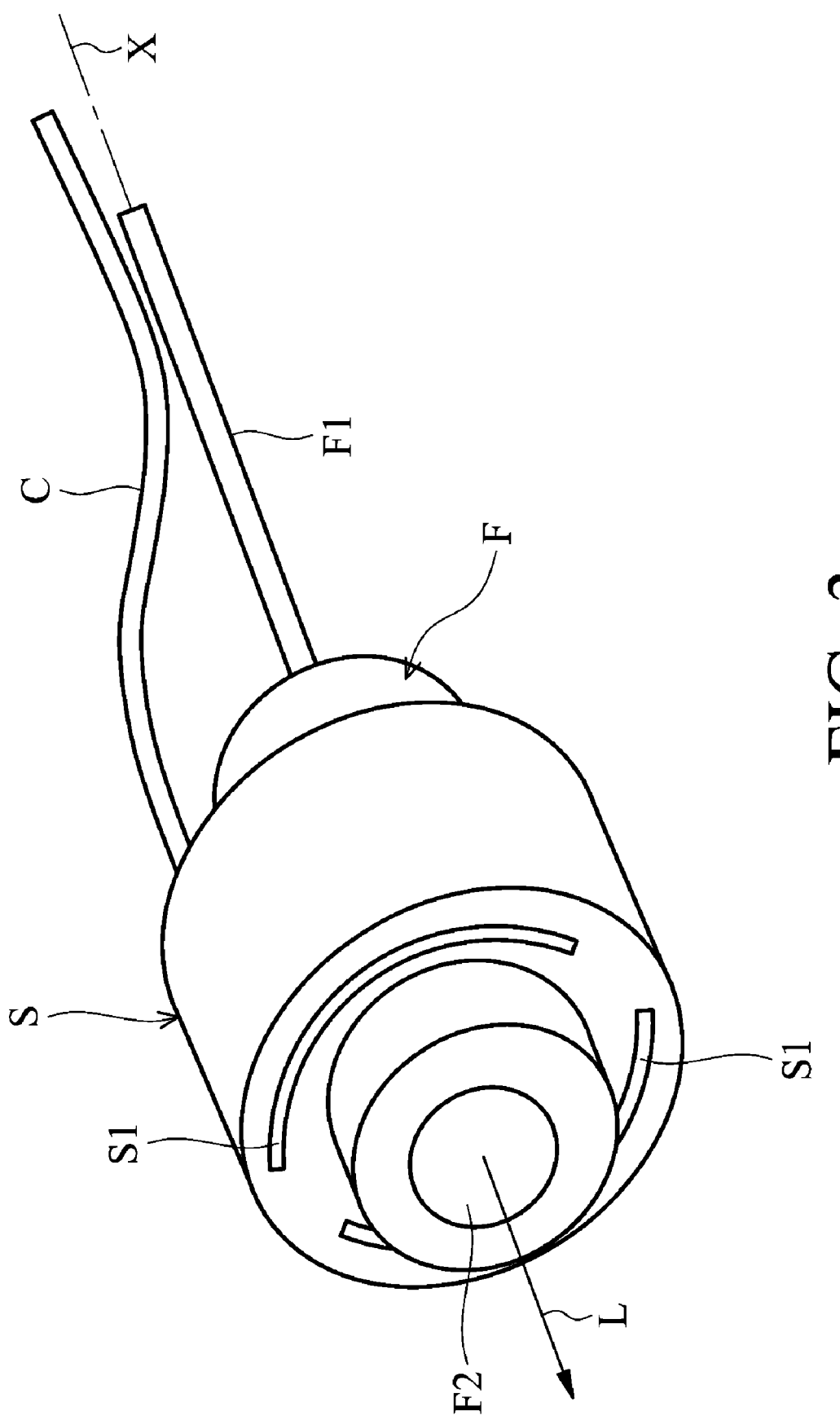
FIG. 3 is a perspective diagram of a diaphragm, a conduit, and an optical fiber module according to an embodiment of the invention.

Referring to FIGS. 1 and 3, the diaphragm S is connected with one or several conduits C. The fluid flows through the conduits C to the diaphragm S and enters the chamber H' via the openings S1. In this embodiment, the diaphragm S may comprise two meniscus-shaped openings S1 communicated with the conduit C. The openings S1 are symmetrical with respect to the central axis X, thus facilitating stable and average hydraulic flow into the chamber H'. In FIG. 3, the optical fiber module F comprises a fiber unit F1 and a lens F2 coupled with the fiber unit F1, wherein the optical fiber module F1 transmits a light beam through the lens F2 along the central axis X.

As shown in FIG. 1, a light beam L transmitted from the optical fiber module F is reflected by the reflector R. The light beam L propagates out of the housing H through a transparent window W thereof for scanning objects outside the probe. In this embodiment, the window W is ring-shaped surrounding the central axis X. When the reflector R rotates with the rotor P, the light beam L is reflected by the reflector R and capable of 360° scanning around a plane perpendicular to the central axis X.

When the chamber H' is filled with the fluid, the space between the reflector R, the lens F2, and the window W is full of fluid medium, thus suppressing interfacial reflections due to index of refraction variations between different media. Similarly, the discharged fluid serves as a useful optical medium between the probe and the inspected objects, so as to reduce energy dissipation and noise due to interfacial reflections. Furthermore, the discharged fluid can clean the inspected objects and remove dirt or contaminants therefrom.

Figure 4:
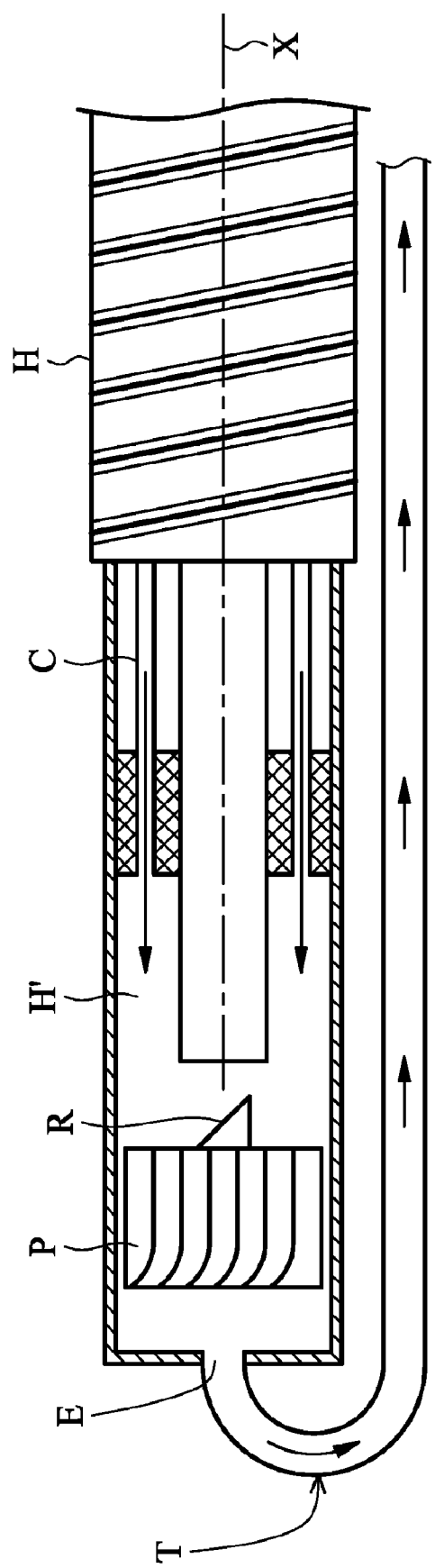
FIG. 4 is a perspective diagram of an optical scanning probe according to another embodiment of the invention.

Referring to FIG. 4, another embodiment of a scanning probe further comprises a tube T communicated with the hole E. The fluid discharged from the chamber H' can be recycled through the tube T. Additionally, the fluid can also be pumped reversely through the tube T into the chamber H', so as to control rotation direction of the rotor P and the fans P1.

Figure 5:
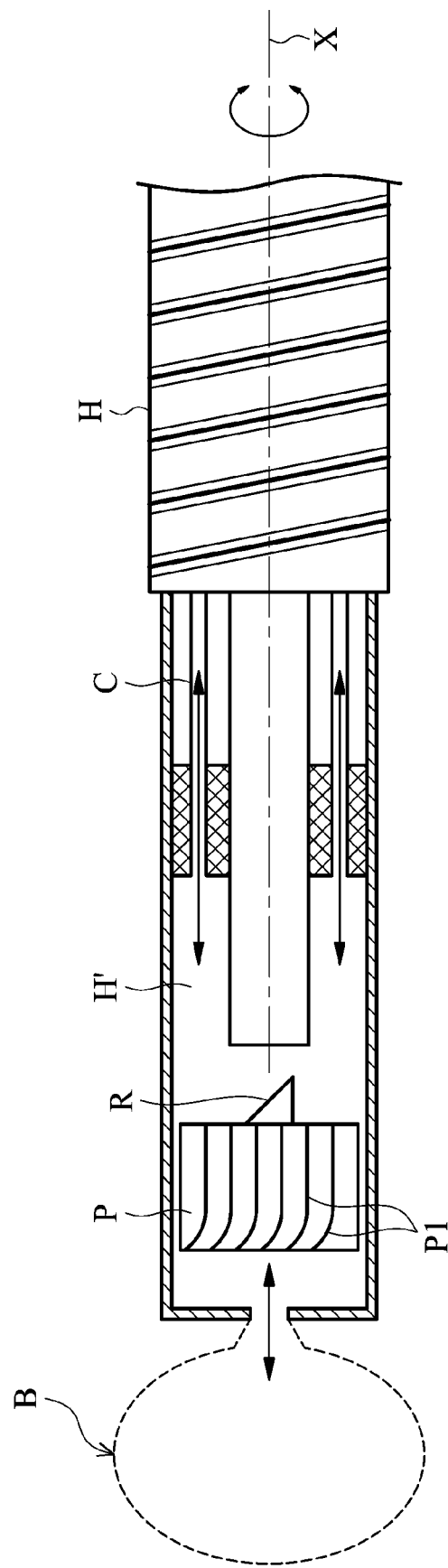
FIG. 5 is a perspective diagram of an optical scanning probe according to another embodiment of the invention.

FIG. 5 depicts another embodiment of a scanning probe which comprises a bag B, such as a plastic bag communicated with the hole E of the housing H. When the fluid is discharged from the chamber H' to the bag B, the bag B expands. Alternatively, when the fluid is sucked from the bag B to the chamber H', the fans P1 are impelled along the direction opposite to the first direction A, so that the rotor R and the reflector R reversely rotate around the central axis X. Since rotation direction and velocity of the reflector R can be controlled by hydraulic pressure, scanning quality and efficiency of the probe are improved.

The invention provides an optical scanning probe having a rotatable reflector driven by hydraulic pressure. As the scanning probe does not need complex driving mechanisms such as micro motors, dimensions thereof are substantially reduced. In another aspect, as scanning direction and velocity of the probe are controlled by the fluid medium, electric potential difference between the probe and the human body is reduced, thus preventing electric shocks and improving safety of usage.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical scanning probe, comprising:
a housing;
a diaphragm disposed in the housing, wherein the diaphragm and the housing form a chamber;
a rotor movably disposed in the chamber, comprising a plurality of fans;
a conduit disposed in the housing for conducting a fluid into the chamber, wherein the fluid impels the fans along a first direction to rotate the rotor around a central axis;
an optical fiber module, disposed in the housing and through the diaphragm for transmitting a light beam, wherein the fluid serves as an optical medium of the light beam for optical scanning; and
a reflector disposed on the rotor and rotated with the rotor to reflect the light beam from the optical fiber module, wherein the rotor and the reflector are disposed opposite to and spaced apart from the optical fiber module along the central axis;
wherein the wherein the housing comprises a hole for discharging the fluid from the chamber; and
wherein the optical scanning probe further comprises a bag communicated with the hole for receiving the fluid from the chamber; and
wherein when the fluid is pumped from the bag into the chamber, the fluid impels the fans along a second direction opposite to the first direction, so that the rotor and the reflector rotate around the axis.

2. The optical scanning probe as claimed in claim 1, wherein the optical fiber module comprises a fiber unit and a lens coupled with the fiber unit, wherein the optical fiber module transmits the light beam through the lens.

3. The optical scanning probe as claimed in claim 1, wherein the optical fiber module is disposed through the diaphragm and extended along the central axis.

4. The optical scanning probe as claimed in claim 1, wherein the chamber is filled with the fluid.

5. The optical scanning probe as claimed in claim 1, wherein the housing comprises plastic.

6. The optical scanning probe as claimed in claim 1, wherein the fluid comprises gas, water, glycerol or glucose.

7. The optical scanning probe as claimed in claim 1, wherein the optical scanning probe further comprises a tube communicated with the hole to conduct the fluid from the chamber.

8. The optical scanning probe as claimed in claim 1, wherein the bag comprises plastic.

9. The optical scanning probe as claimed in claim 1, wherein the diaphragm comprises at least an opening communicated with the conduit to conduct the fluid into the chamber.

10. The optical scanning probe as claimed in claim 9, wherein the opening is meniscus-shaped.

11. The optical scanning probe as claimed in claim 9, wherein the diaphragm further comprises a plurality of openings communicated with the conduit.

12. The optical scanning probe as claimed in claim 11, wherein the openings are symmetrical with respect to the central axis.

13. The optical scanning probe as claimed in claim 11, wherein the optical scanning probe further comprises a plurality of conduits communicated with the openings.

14. The optical scanning probe as claimed in claim 1, wherein the housing further comprises a transparent window, and the light beam propagates out of the housing through the window.

15. The optical scanning probe as claimed in claim 14, wherein the window is ring-shaped surrounding the central axis.

16. The optical scanning probe as claimed in claim 1, wherein the fluid serves as the optical medium when discharged from the optical scanning probe and between the scanning probe and an inspected object.

* * * * *